United States Patent
Kulkarni et al.

(10) Patent No.: US 10,122,605 B2
(45) Date of Patent: Nov. 6, 2018

(54) ANNOTATION OF NETWORK ACTIVITY THROUGH DIFFERENT PHASES OF EXECUTION

(71) Applicant: Cisco Technology, Inc., San Jose, CA (US)

(72) Inventors: Karthik Kulkarni, Fremont, CA (US); Raghunath Nambiar, San Ramon, CA (US)

(73) Assignee: CISCO TECHNOLOGY, INC, San Jose, CA (US)

( * ) Notice: Subject to any disclaimer, the term of this patent is extended or adjusted under 35 U.S.C. 154(b) by 43 days.

(21) Appl. No.: 14/629,151

(22) Filed: Feb. 23, 2015

(65) Prior Publication Data

US 2016/0011925 A1   Jan. 14, 2016

Related U.S. Application Data

(63) Continuation-in-part of application No. 14/327,385, filed on Jul. 9, 2014.

(51) Int. Cl.
*G06F 11/00* (2006.01)
*H04L 12/26* (2006.01)
(Continued)

(52) U.S. Cl.
CPC ...... *H04L 43/0817* (2013.01); *G06F 11/3006* (2013.01); *G06F 11/3409* (2013.01);
(Continued)

(58) Field of Classification Search
CPC .... G06F 11/34; G06F 11/079; G06F 11/3006; G06F 11/3409; H04L 43/06; H04L 43/065; H04L 43/08; H04L 43/0817
See application file for complete search history.

(56) References Cited

U.S. PATENT DOCUMENTS

| | | |
|---|---|---|
| 5,812,773 A | 9/1998 | Norin |
| 5,889,896 A | 3/1999 | Meshinsky et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Lynch, Sean, "Monitoring cache with Claspin," Facebook Engineering, Sep. 19, 2012.

(Continued)

*Primary Examiner* — Michael Maskulinski
(74) *Attorney, Agent, or Firm* — Polsinelli PC

(57) ABSTRACT

The subject technology provides a drillable time-series heat map, which combines information of separate network element (e.g., switch, router, server or storage) and relates them together through impact zones to correlate network wide events and the potential impact on the other units in the network. The subject technology also brings together the network and its components, the distributed application(s) and a heat map controller to proactively communicate with one another to disseminate information such as failures, timeouts, new jobs, etc. For an individual job (e.g., for a distributed application), the subject technology may monitor consumption of resources during different phases of execution to provide individual job profile data that could be presented as a drillable heat map. The heat map, in this regard, nay include resource utilization heat metrics of resources such as CPU, Input/Output (I/O), memory, etc., in the heat map or graphs and presented along with network activity.

20 Claims, 13 Drawing Sheets

(51) Int. Cl.
    *G06F 11/30* (2006.01)
    *G06F 11/34* (2006.01)
    *H04L 12/24* (2006.01)

(52) U.S. Cl.
    CPC ........ *G06F 11/3065* (2013.01); *H04L 41/147* (2013.01); *H04L 43/067* (2013.01); *H04L 43/16* (2013.01)

(56) References Cited

U.S. PATENT DOCUMENTS

| | | |
|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer Shankar et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 * | 5/2008 | Williams ............... G06F 11/079 702/183 |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 * | 7/2007 | Crawford ............ G06F 11/0709 714/6.1 |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |

(56) References Cited

U.S. PATENT DOCUMENTS

| | | |
|---|---|---|
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1* | 5/2010 | Baker .................. G06F 11/0709 714/37 |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1* | 11/2010 | Augenstein ........... G06F 11/324 709/224 |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1* | 9/2011 | Kunii .................. G06F 11/0727 714/57 |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1* | 3/2013 | Nagai .................. G06F 11/0709 709/224 |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1* | 7/2013 | Pacheco .................. G09G 5/02 345/594 |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1* | 10/2013 | Dodson .................. G06F 11/328 706/11 |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |

(56) References Cited

U.S. PATENT DOCUMENTS

| | | |
|---|---|---|
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1* | 3/2014 | Noel ............... G06F 9/542 707/741 |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1* | 3/2014 | Cherkasova ....... G06F 11/3404 714/6.13 |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1* | 7/2014 | Cherkasova ....... G06F 11/3428 718/102 |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0297569 A1 | 10/2014 | Clark et al. |
| 2014/0297835 A1 | 10/2014 | Buys |
| 2014/0310391 A1 | 10/2014 | Sorensen, III et al. |
| 2014/0310417 A1 | 10/2014 | Sorensen, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1* | 1/2015 | Sasturkar ........... G06F 11/0709 714/57 |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1* | 10/2015 | Pearson ............... G06F 11/323 714/57 |
| 2015/0319063 A1 | 11/2015 | Zourzouvillys et al. |
| 2015/0326524 A1 | 11/2015 | Tankala et al. |
| 2015/0339210 A1* | 11/2015 | Kopp ............... G06F 11/3495 718/100 |
| 2015/0373108 A1 | 12/2015 | Fleming et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1* | 8/2016 | Babu ............... G06F 11/3495 |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

"Apache Ambari Meetup What's New," Hortonworks Inc., Sep. 2013.

"Introduction," Apache Ambari project, Apache Software Foundation, 2014.

Amedro, Brian, et al., "An Efficient Framework for Running Applications on Clusters, Grids and Cloud," 2010, 17 pages.

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

(56) References Cited

OTHER PUBLICATIONS

Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "CloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.

Ford, Bryan, et al., Peer-to-Peer Communication Across Network Address Translators, in USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Meireles, Fernando Miguel Dias, "Integrated Management of Cloud Computing Resources," 2013-2014, 286 pages.
Meraki, "Meraki releases Industry's first cloud-managed routers," Jan. 13, 2011, 2 pages.
Mu, Shuai, et al., "ULibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.

(56) References Cited

OTHER PUBLICATIONS

Wkipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wkipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11$^{th}$ International Conference on Computer and Information Science, 2012 IEEE, 5 pages.

\* cited by examiner

ANNOTATION OF NETWORK ACTIVITY THROUGH DIFFERENT PHASES OF EXECUTION

CROSS-REFERENCE TO RELATED APPLICATION

This application is a continuation-in-part of U.S. application Ser. No. 14/327,385 filed Jul. 9, 2014.

BACKGROUND

Data centers employ various services (aka applications). Such services often demand readily available, reliable, and secure networks and other facilities, such as servers and storage. Highly available, redundant, and scalable data networks are particularly important for data centers that host business critical and mission critical services.

Data centers are used to provide computing services to one or more users such as business entities, etc. The data center may include computing elements such as server computers and storage systems that run one or more services (dozens and even hundreds of services are not uncommon). The data center workload at any given time reflects the amount of resources necessary to provide one or more services. The workload is helpful in adjusting the allocation of resources at any given time and in planning for future resource allocation planning.

BRIEF DESCRIPTION OF THE DRAWINGS

The embodiments of the present technology will hereinafter be described in conjunction with the appended drawings, provided to illustrate and not to limit the technology, wherein like designations denote like elements, and in which.

DETAILED DESCRIPTION

Figure 1:
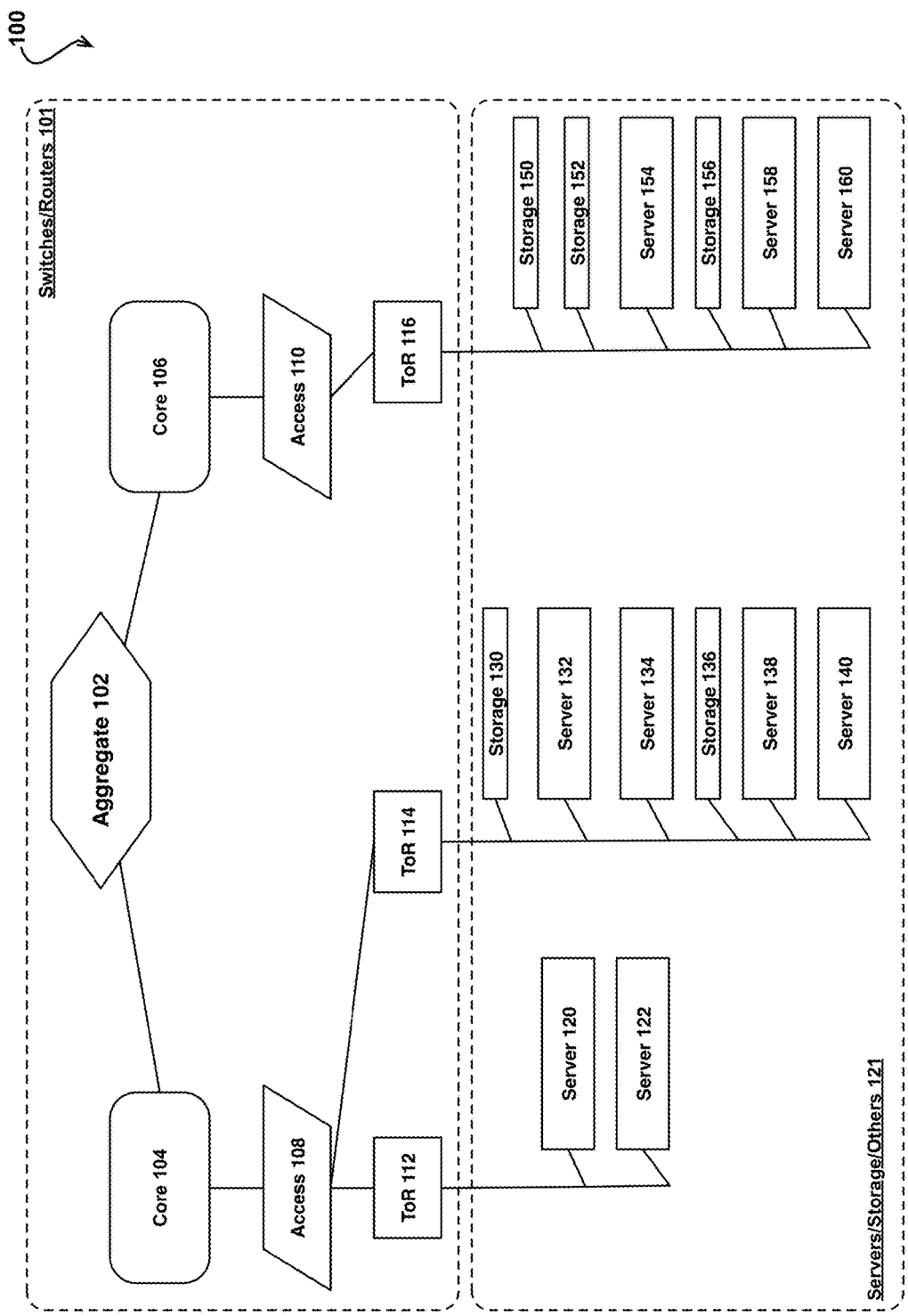
FIG. 1 shows an example graphical user interface for displaying a network topology in a data center including several network elements or nodes.

Systems and methods in accordance with various embodiments of the present disclosure may overcome one or more deficiencies experienced in existing approaches to monitoring network activity and troubleshooting network issues.

Overview

Embodiments of the subject technology provide for receiving a message indicating a problem at a network element in a network. Responsive to the message, an indication of the problem at the network element is provided for display in a graphical representation of a heat map. Based at least on a location of the network element in the network, a set of adjoining network elements connecting directly to the network element is identified. Each of the set of adjoining network elements is then flagged to indicate inclusion in an impact zone associated with the problem at the network element. A second indication is provided for display in the graphical representation of the heat map of the inclusion of each of the adjoining network elements in the impact zone.

Embodiments of the subject technology further provide for receiving information for a job to be processed by a distributed application, the job being submitted from a user or other application and having at least two phases of execution for completion of the job. A set of network elements are identified to monitor during processing of the job, the set of network elements corresponding to nodes that are involved in at least a first phase of the job. Further, the set of network elements are monitored, over a period of time, during processing of the job for the at least two phases of execution. In an embodiment, a failure is detected during at least one phase of execution in at least one network element. Job profile data is then generated indicating at least the failure.

Description of Example Embodiments

While existing implementations may provide ways to monitor 1) network level metrics (e.g., Rx (received traffic), Tx (transmitted traffic), errors, ports up/down, tail drops, buffer overflows, global routing information, maximum and minimum frame rate, packet forwarding rate, throughput, transactions per second, connections per second, concurrent connections, etc.), 2) server level metrics (e.g., CPU usage, RAM usage, Disk usage, disk failures, ports up/down) and 3) alerts, these metrics are isolated and may not be intuitive for real-time monitoring in a large data-center with hundreds and thousands of servers and switches. Further, it is not intuitive to troubleshoot issues (e.g., to identify the root cause of problems in a data center or a network just at looking at symptom areas as the problem could have originated elsewhere in the data center but the symptoms are seen elsewhere). Thus, there could be a need for more intuitive approach of monitoring and troubleshooting with global and deeper insights.

In some embodiments, three different levels of metrics or network characteristics can be observed from switches, routers and other network elements in a datacenter (or a campus network):

1. Global network metrics, routing metrics, performance metrics and/or alerts;
2. Rack level networking with switching top-of-rack metrics, port level metrics, receive/transmit rate, errors, tail drops, buffer overflows, etc.;
3. Through various components at an individual server level, (for example such as unified computing system) and/or storage level: server/storage hardware performance (CPU, server level networking, RAM, Disks I/O), failures (server level networking, storage up/down)

In a data-center, applications (such as "Big Data" applications) and consequences caused by a node failure may in turn affect the traffic or load on the network system, this is because, a node failure would cause the data being lost to be copied from other nodes to maintain the multiple replication policy of every file generally set in a distributed system. As used herein, the phrase "Big Data" refers to a collection of data or data sets so large and complex that it becomes difficult to process using on-hand database management tools or traditional data processing applications, and the phrase "Big Data applications" refers to applications that handle or process such kind of data or data sets.

The following example scenarios illustrate situations in which improved monitoring and management of networking traffic as provided by the subject technology are applicable. For instance, a big data application (e.g., Hadoop, NoSQL, etc.) may start a job by ingesting 10 TB of data. During the job, a server or disk may fail (leading to copy of the data stored in these nodes). In addition, an expected increase in data traffic predictably at a specific time (e.g., certain scheduled bank operations backing up data, etc.) may affect decisions regarding network traffic management. When any of the aforementioned events or conditions occur, the application has knowledge of where the data is flowing and also an idea of how long the data would be ingested (e.g., based on size and/or bandwidth). However, existing implementations for managing network traffic may be blind or unaware of this type of application level information and if performing routing decisions and further network actions totally ignorant of this information which is available to the applications. The subject technology described herein proposes several approaches in order to fill these deficiencies of existing implementations. Various other functions and advantages are described and suggested below as may be provided in accordance with the various embodiments.

Solely using observed metrics at network elements (e.g., network devices such as switches, routers, servers, storage device, or one or more components of a network device such as one or more network ports of a switch or router, etc.) to indicate "heat" or activity (e.g., utilization, performance and/or a problem at a network element or node) of a network element(s) or device(s) (e.g., switches, routers, servers, storage device, etc.) would likely be an incomplete approach to network monitoring. For instance, observed metrics represent a single snapshot (even if considered over a longer duration) in time with zero awareness as to the likely future utilization if an application(s) that generates data sent through the network is ignored especially when that knowledge is already available with the application as is the case here.

In some typical Big Data scenarios, most utilization of network resources are defined by the applications (e.g., data ingestion due to a new job starting, output of a job finishing, replication due to disk/server failure, etc.). In an example, a network switch A could be graphically represented in a color green to indicate underutilization while a switch B might be graphically represented in a color orange to indicate slight or minor utilization. However, a new job from an application could be ingesting data which would be passing through switch A for the next 30 minutes or more and switch B might not have additional traffic in the near future. Thus, choosing a path through switch A would be a bad decision that could be avoided if the "heat" metrics are measured along with inputs from the application.

Embodiments of the subject technology provide additional information of what is planned/estimated (e.g., in terms of network traffic and resource such as I/O bandwidth, memory, CPU and/or other resource utilization, etc.) on the network and the compute and storage systems with the already available and observed "actual metrics" in order to determine "planned/estimated metrics" for use in improving network and other resource (e.g., input/output, Memory, CPU, etc.) management in a given application (e.g., big data application). The use of "Recursive Impact Zones" as further described herein enables adaptive scheduling/routing of network traffic through the network topology as well as enabling global view for monitoring and troubleshooting network issues in a data center or any large network. The combination of application level intelligence that uses planned/estimated metrics with the observed data/metrics result in more realistic metrics of network traffic in the network.

Another advantage of the subject technology is bringing together in a single drillable time-series heat map, information of separate units (e.g., switch, router, server or storage) and relating them or binding them together through impact zones to correlate network wide events and the potential impact on the other units in the network. This could more clearly indicate the overall health of the datacenter.

The subject technology also brings together the network and its components (storage, ToR switches, servers, routers, etc.), the distributed application(s) and a heat map controller (described further herein) to proactively communicate with one another to quickly disseminate information such as failures, timeouts, new jobs, etc. Such communication ensures a more predictive picture of the network and enable better adaptive scheduling and routing, which may result in better utilization of resources.

FIG. 1 shows an example graphical user interface 100 (GUI 100) for displaying a network topology in a data center including several network elements or nodes. In the example of FIG. 1, the GUI 100 divides a graphical representation of the network topology into a section 101 for switches and/or routers and a section 121 for servers, storage devices and/or other types of network devices or components. The GUI 100 may be provided by network management application (e.g., a heat-map controller described herein) in at least one example.

As illustrated in FIG. 1, the GUI 100 includes a representation of an aggregation or aggregate switch 102, core switches 104 and 106, and access switches 108 and 110. The aggregate switch 102, in some embodiments, aggregates network traffic from the core switches 104 and 106. The core switch 104 is connected to the access switch 108 and the core switch 106 is connected to access switch 110. Although a particular network topology is illustrated in the example of FIG. 1, it is appreciated that other types of network devices, computing systems or devices may be included and still be within the scope of the subject technology. Further, although the network topology is described herein as including the aggregate switch 102, core switches 104 and 106, and access switches 108 and 110, it is appreciated that embodiments of the subject technology may include routers instead and still be within the scope of the subject technology. For instance, one or more of the switches illustrated in FIG. 1 could be a respective router(s) instead. In some embodiments, the functionality of a switch and a router may be provided in a single network element of the network topology shown in FIG. 1.

In some embodiments, a top-of-rack model defines an architecture in which servers are connected to switches that are located within the same or adjacent racks, and in which these switches are connected to aggregation switches typically using horizontal fiber-optic cabling. In at least one embodiment, a top-of-rack (ToR) switch may provide multiple switch ports that sit on top of a rack including other equipment modules such as servers, storage devices, etc. As used herein, the term "rack" may refer to a frame or enclosure for mounting multiple equipment modules (e.g., a 19-inch rack, a 23-inch rack, or other types of racks with standardized size requirement, etc.). Each ToR switch may be connected to different types of equipment modules as shown in FIG. 1.

As further illustrated, the access switch 108 is connected to a ToR switch 112. The ToR switch 112 is connected to servers 120 and 122. The access switch 108 is connected to a ToR switch 114. The ToR switch 114 is connected to storage device 130, server 132, server 134, storage device 136, server 138 and server 140. The access switch 110 is connected to the ToR switch 116. The ToR switch 116 is connected to storage device 150, storage device 152, server 154, storage device 156, server 158 and server 160.

In at least one embodiment, each representation of network elements shown in FIG. 1 may be displayed in a particular color (e.g., green) to indicate that the corresponding network element is currently operating at a normal status (e.g., without any significant issue(s)).

Figure 2:
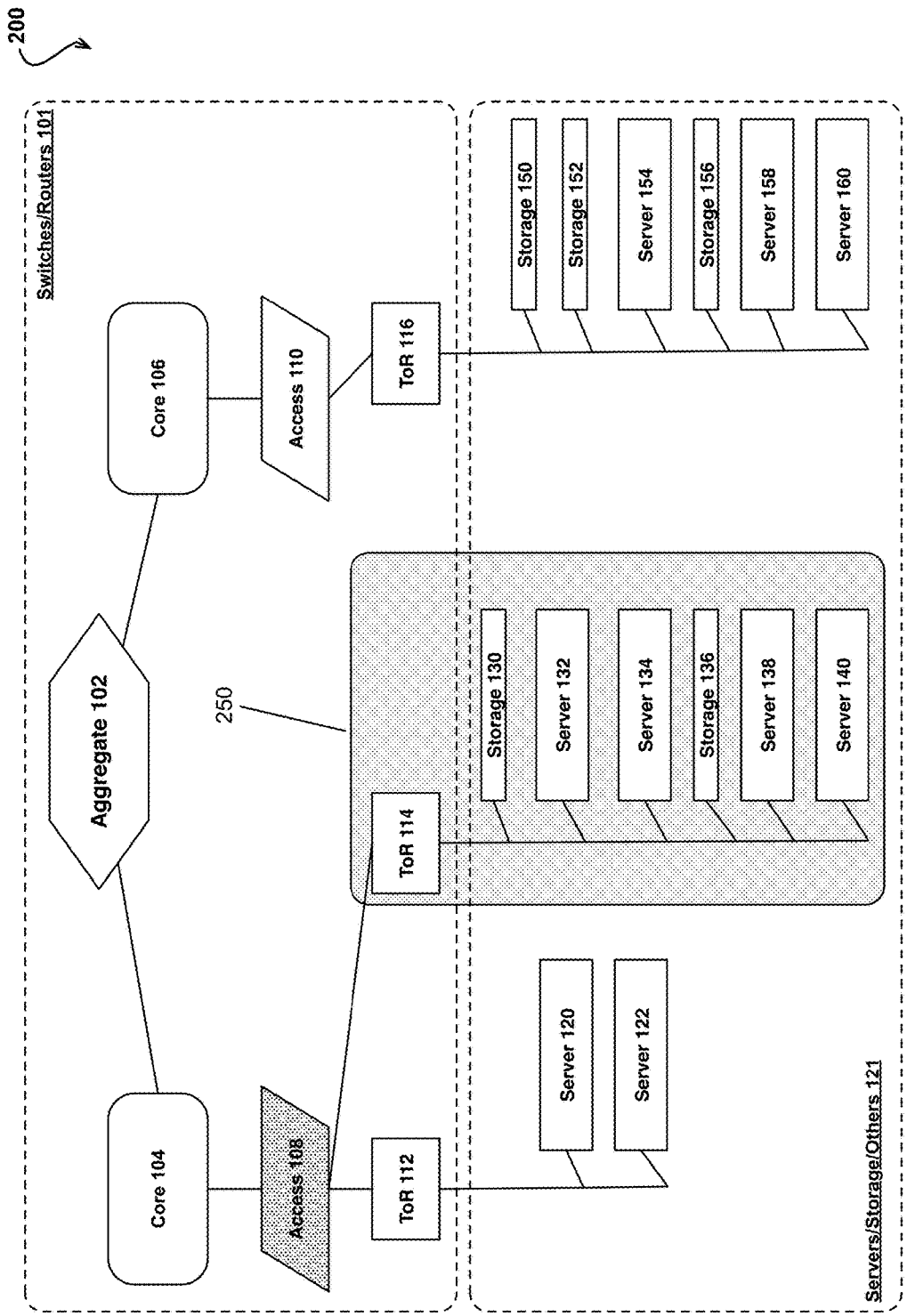
FIG. 2 shows an example graphical user interface for indicating a problem in the network topology of the data center.

FIG. 2 shows an example graphical user interface 200 (GUI 200) for indicating a problem in the network topology of the data center. The GUI 200 is the same as the GUI 100 but differs in that portions of the network elements are depicted in different ways to indicate a problem or impacted region of the network.

As shown in the example of FIG. 2, the access switch 108 is displayed in a particular color (e.g., red) to indicate that one or more problems are seen at the access switch 108 (for e.g., a particular port went down or is seeing packet drops or buffer overflows). Further, a grayed (or highlighted) section 250 is displayed that indicates a region of the network topology that is impacted from the problem seen at the access switch 108 (this affected network would be directly connected to the problem port as mentioned above). By providing the grayed section 250, the GUI 200 may indicate, in a visual manner, portions of the network topology that are impacted from problems from other network elements in the network topology. A user is therefore able to discover problems in the network topology without performing a lengthy investigation. It should be understood that the grayed section 250 does not necessarily indicate that there will be a failure in that region of the network topology, but a correlation of a potential failure may be determined based at least on the grayed section 250.

The subject technology provides recursive impact zones for monitoring and troubleshooting at one or more points of inspection which will be described in more detail in the following sections.

As used herein, a "point of inspection" is anything (e.g., network element, computing device, server, storage device, etc.) that is being monitored to provide metrics that may change the color or graphical representations of the heat maps. This includes, but is not limited to, the following: 1) switches, routers, servers or storages as a whole (up/down status); 2) network port of a switch (monitoring Tx, Rx, errors, bandwidth, tail drops, etc.); 3) egress or ingress buffer of network ports; 4) CPU or memory of switch or routers (e.g., packets going to CPU that slows the switch); 5) CPU or memory of servers; 6) memory (e.g., errors); 7) disks (e.g., failures), etc.

As used herein, an "impact zone" in a data center or network includes all adjoining network elements (e.g., switches (edge, aggregate, access, etc.), routers, ToR switches, servers, storage, etc.) connecting directly to a network element corresponding to a point of inspection such as a switch, router, server or storage device, etc. Thus, it is understood that an impact zone includes at least a portion of the network topology of a data center or network in at least one embodiment.

A "recursive impact zone," as used herein, defines a hierarchical impact zone which includes all the further adjoining units connected to an initial point of inspection. For example, suppose a port in the aggregate switch or router goes down. First, this would impact the top-of-rack switch connecting to that port in the aggregate switch, which in turn takes all the servers connected to the top-of-rack out of the network. Consequently, a three (3) level hierarchical impact zone is defined in this example 1) starting from the aggregate switch, 2) continuing to the top-of-rack switch, and 3) then to each server connected to the top-of-rack switch. In contrast, a top-of-rack switch connected to an adjoining port of the same aggregate switch, which is currently up, would not be part of this impact zone as this adjoining port is not affected.

Figure 3:
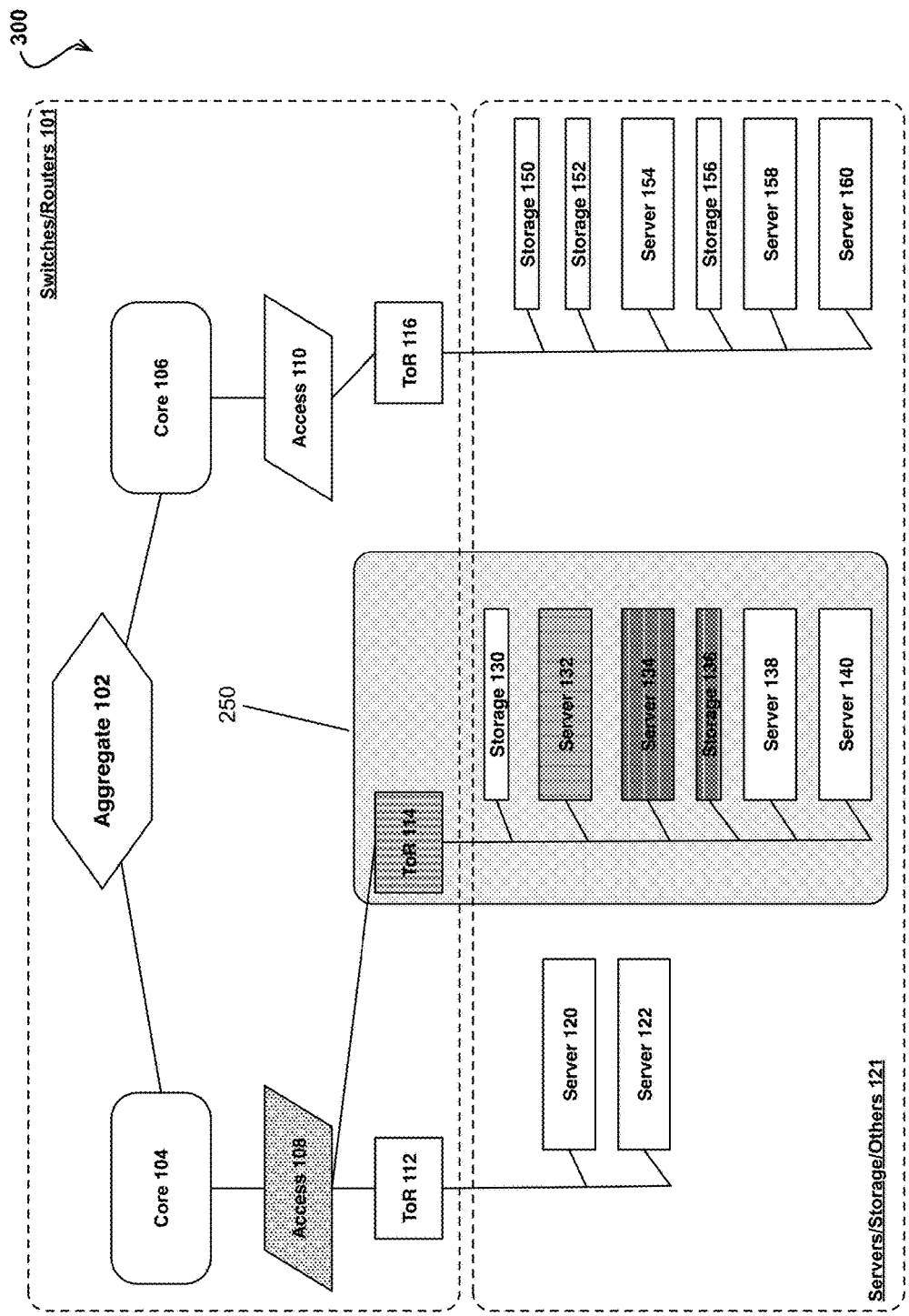
FIG. 3 shows an example graphical user interface for indicating an affected network element(s) stemming from a problem or failure of another network element(s).

FIG. 3 shows an example graphical user interface 300 (GUI 300) for indicating an affected network element(s) stemming from a problem or failure of another network element(s). The GUI 300 is the same as the GUI 200 but differs in that additional network elements are depicted in further ways to indicate, in a more targeted manner, affected network elements.

As illustrated in FIG. 3, the access switch 108 is indicated in the GUI 300 as having a problem or issue(s) such as a respective port on the access switch 108 being down. Thus, a recursive impact zone in the GUI 300 includes the access switch 108, the ToR switch 114, the storage device 130, the server 132, the server 134, the storage device 136, the server 138 and the server 140. As further indicated, the ToR switch 114 and the server 132 may be depicted in the GUI 300 in a particular color (e.g., orange) to indicate that the ToR switch 114 and the server 132 are in a busy state but do not (yet) exhibit any errors or problems at the time being. The server 134 and the storage device 136 may be graphically indicated in a different color (e.g., red) to indicate that these network elements have issue(s) or problem(s) that have been propagated from the port of the access switch 108 being down. As further shown, the storage device 130, the server 138 and the server 140 are indicated in a different color (e.g., green) to indicate that these network elements are currently operating in a normal state and not affected by the port having problems at the access switch 108.

It is appreciated that other types of graphical representations to indicate normal, busy, or problem status (or any other status) at each of the network elements in the network topology may be used and still be within the scope of the subject technology. By way of example, such other types of graphical representations may include not only other colors, but patterns, highlighting, shading, icons, or any other graphical indication type.

In some embodiments, the subject technology provides a heat map (or "heatmap" or "heat-map" as used herein), which is a graphical representation of data in a matrix (a set of respective cells or blocks) where values associated with cells or blocks in the matrix are represented as respective colors. Each cell in the matrix refers to a router or switch or a server (with or without storage), a storage unit or storage device or other IP device (e.g., IP camera, etc.). The heat (represented by a color(s) ranging from green to orange to red) in the matrix indicates the overall health and performance or usage of the network, server, storage unit or device. As the usage is low or the unit is free, and there are no alerts or failures, the cell is green colored and as the units usage is reaching thresholds or if it has a failure or errors, the cell gets closer to a red color. In some embodiments, a color such as orange indicates the system is busy but has not reached its threshold.

Figure 4:
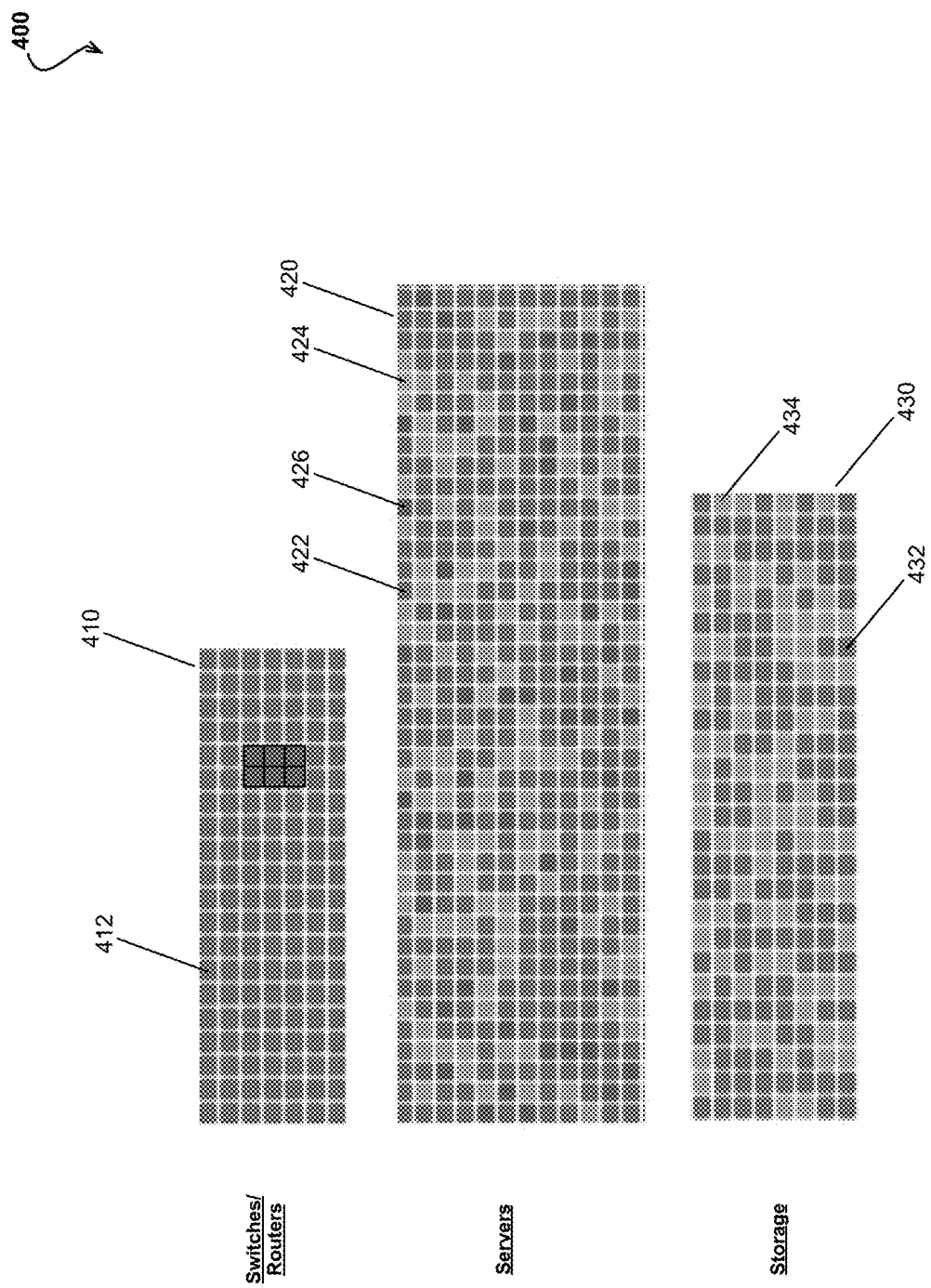
FIG. 4 illustrates a display of a set of heat maps in accordance with some embodiments of the subject technology.

FIG. 4 illustrates a display 400 of a set of heat maps in accordance with some embodiments of the subject technology. The display 400 may be provided in a GUI as part of a heat-map controller application as further described herein.

As illustrated, the display 400 includes heat map 410, heat map 420 and heat map 430. Each heat map represents a respective level in a hierarchy of network elements in a network topology. For instance, the heat map 410 corresponds to switches and routers, the heat map 420 corresponds to servers, and the heat map 430 corresponds to storage devices. Although three levels of network elements are illustrated in the example of FIG. 4, it is appreciated that more or less numbers of levels may be included to represent other types of network elements.

As discussed before, each heat map provides a graphical representation of data in a matrix, including respective cells or blocks, where values associated with cells or blocks in the matrix are represented as one or more colors. The color assigned to a cell in the matrix indicates the overall health and performance or usage of the network, server or storage device. For example, cells 412, 422 and 432 are assigned a green color to indicate that the respective usage of the corresponding network elements is low and there are no alerts or failures. Cells 424 and 434 are assigned an orange color indicating that the corresponding network elements are busy but have not reached a threshold usage level. Cell 426 is assigned a red color to indicate that the corresponding network element is reaching a threshold usage level or that the network element has a failure or error(s).

Figure 5:
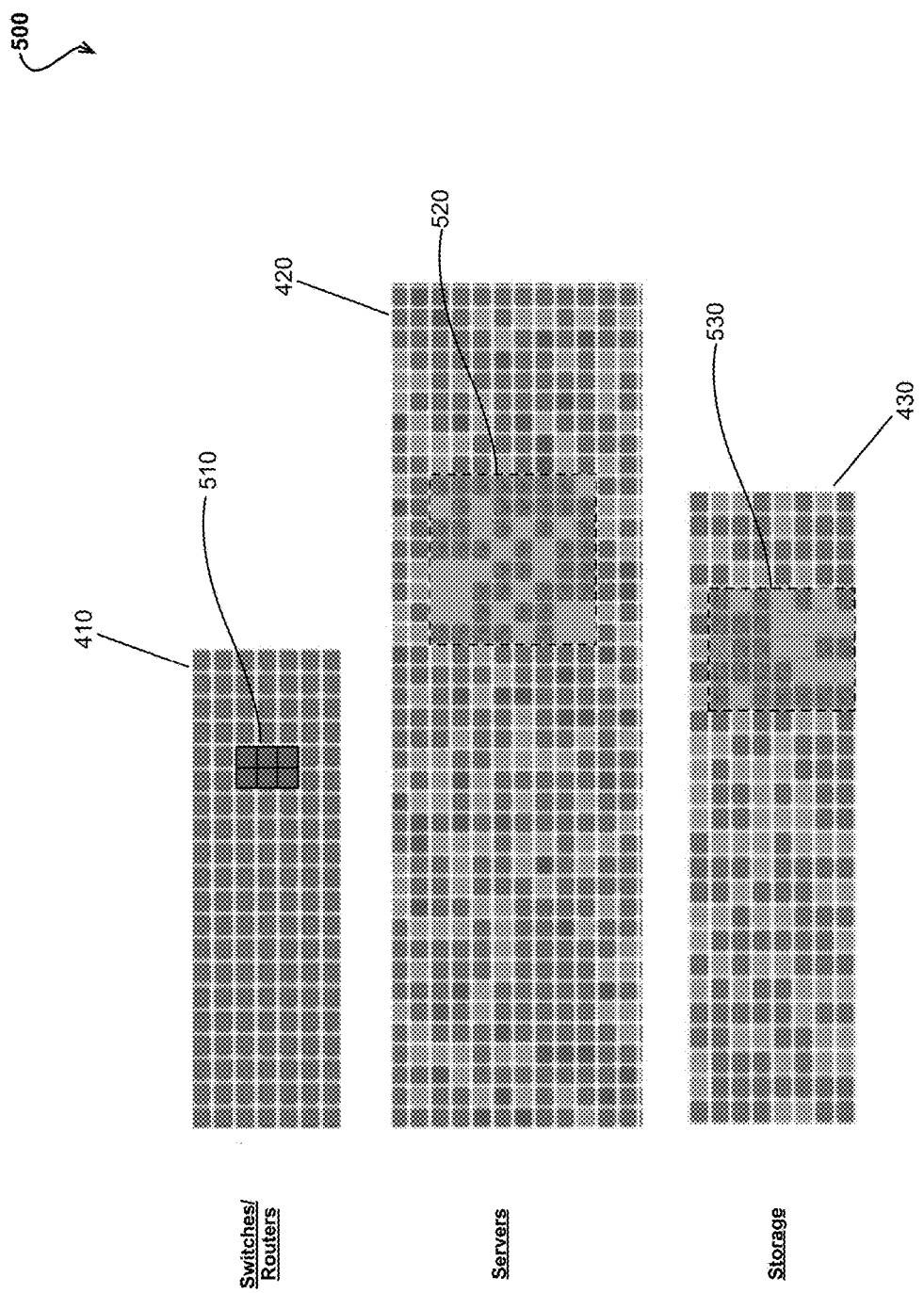
FIG. 5 illustrates a display of a set of heat maps indicating affected portions of a network topology in accordance with some embodiments of the subject technology.

FIG. 5 illustrates a display 500 of a set of heat maps indicating affected portions of a network topology in accordance with some embodiments of the subject technology. The display 500 may be provided in a GUI as part of a heat-map controller application as further described herein. The display 500 is similar to the display 400 in FIG. 4 with the addition of other graphical elements to indicate impact zones and highlight problem in portions of the network topology.

In some embodiments, the heat maps shown in FIG. 5 may be implemented as drillable heat maps. As used herein, a "drillable" heat map adds a time dimension to a traditional 2D heat map. These matrix cells can be clicked on (e.g., drilled into), to reveal time series information on the historic metrics. Such time series information may be in the form of a graph in which data corresponding to a respective metric is graphed over time.

As discussed before, the heat maps may correspond to respective network elements such as switches, routers, top-of-rack switches, servers or storage devices (or other network appliances). Each of the aforementioned network elements may be intelligently monitored on a single window (e.g., "pane") or graphical display screen through drillable heat maps with time series information. Further, drilling or selecting red matrix cells can pinpoint in a time series when a problem or issue occurred.

As illustrated, red section 510 indicates a problem seen in respective switches or routers corresponding to the cells included in red section 510. A grayed section 520 represents an impact zone in servers and a grayed section 530 represents an impact zone in storage devices. In some embodiments, impact zones can determined based at least in part on information from using the Neighbor Discovery Protocol (NDP) and through manual configurations that form a logical dependency graph.

Figure 6:
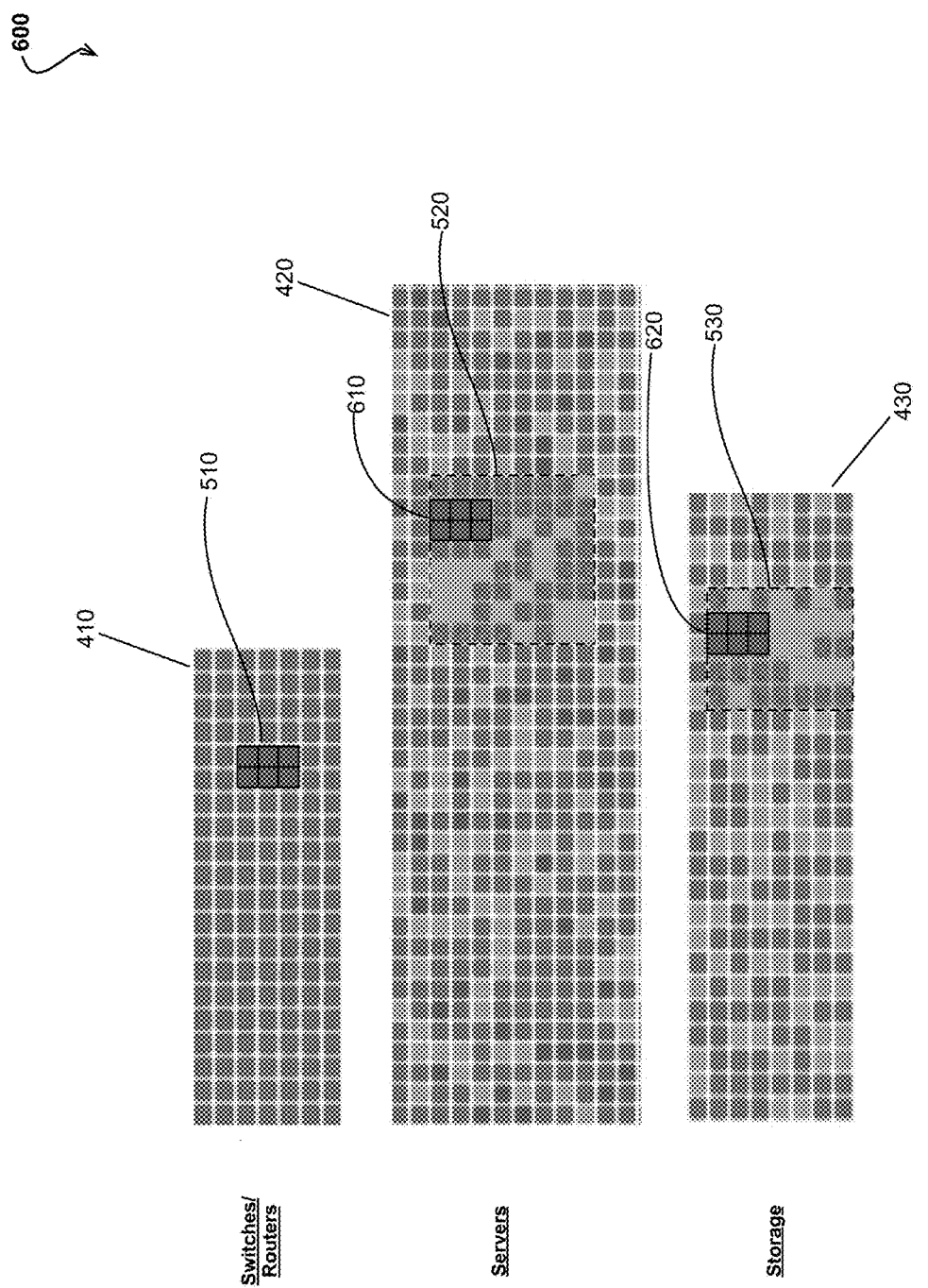
FIG. 6 illustrates a display of a set of heat maps further indicating affected portions of a network topology in accordance with some embodiments of the subject technology.

FIG. 6 illustrates a display 600 of a set of heat maps further indicating affected portions of a network topology in accordance with some embodiments of the subject technology. The display 600 may be provided in a GUI as part of a heat-map controller application as further described herein. The display 600 is similar to the displays 400 and 500 in FIGS. 4 and 5 with the addition of other graphical elements to indicate impact zones and highlight problem in portions of the network topology.

In some configurations, a user may provide input to (e.g., hover over) the red section 510 to determine which portions of the network topology that are affected by an error or failure of switches or routers corresponding to the cells in the red section 510. As shown, a red section 610 indicates servers that are affected by the problems from the switches or routers associated with cells from the red section 510. Further, it is seen that a red section 620 indicates storage devices that are affected by the problems from the switches or routers associated with cells from the red section 510. In some embodiments, the heat maps shown in FIG. 6 may be implemented as drillable heat maps.

Figure 7:
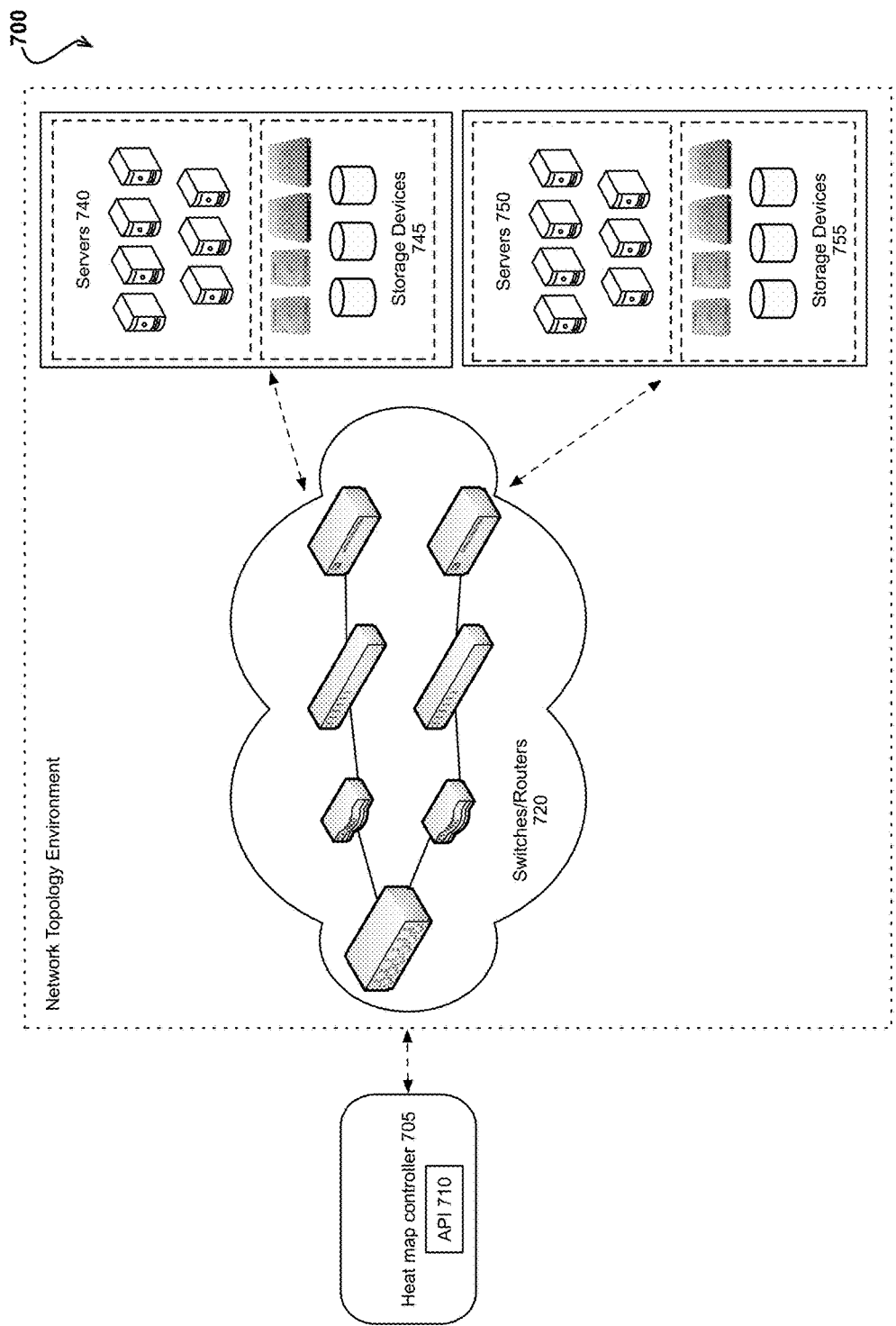
FIG. 7 illustrates an example network topology environment including a heat map controller application in accordance with some embodiments of the subject technology.

FIG. 7 illustrates an example network topology environment 700 including a heat map controller application in accordance with some embodiments of the subject technology.

As illustrated, a heat map controller 705 is provided. In at least one embodiment, the heat map controller 705 is implemented as an application that each network element in a network topology environment periodically communicates with to provide one or more metrics. The heat map controller 705 communicates with the network elements to exchange information and has the most current consolidated information of the network in its database. By way of example, the heat-map controller may be implemented as part of a SDN (Software-Defined Network) application or part of a Hadoop Framework using technologies such as (but not limited to) OpenFlow, SNMP (Simple Network Management Protocol), OnePK (One Platform Kit) and/or other messaging APIs for communication with network elements to receive information related to metrics. In some embodiments, communication between the heat map controller 705 and network elements could be initiated from the network element to the heat map controller 705 based on application events, or hardware events as explained further below. As shown, the heat map controller 705 may include an API 710 that enables one or more network elements such as switches or routers 720, servers 740 and 750, and storage devices 745 and 755 to make API calls (e.g., in a form of requests, messaging transmissions, etc.) to communicate information regarding metrics to the heat map controller 705.

Figure 8:
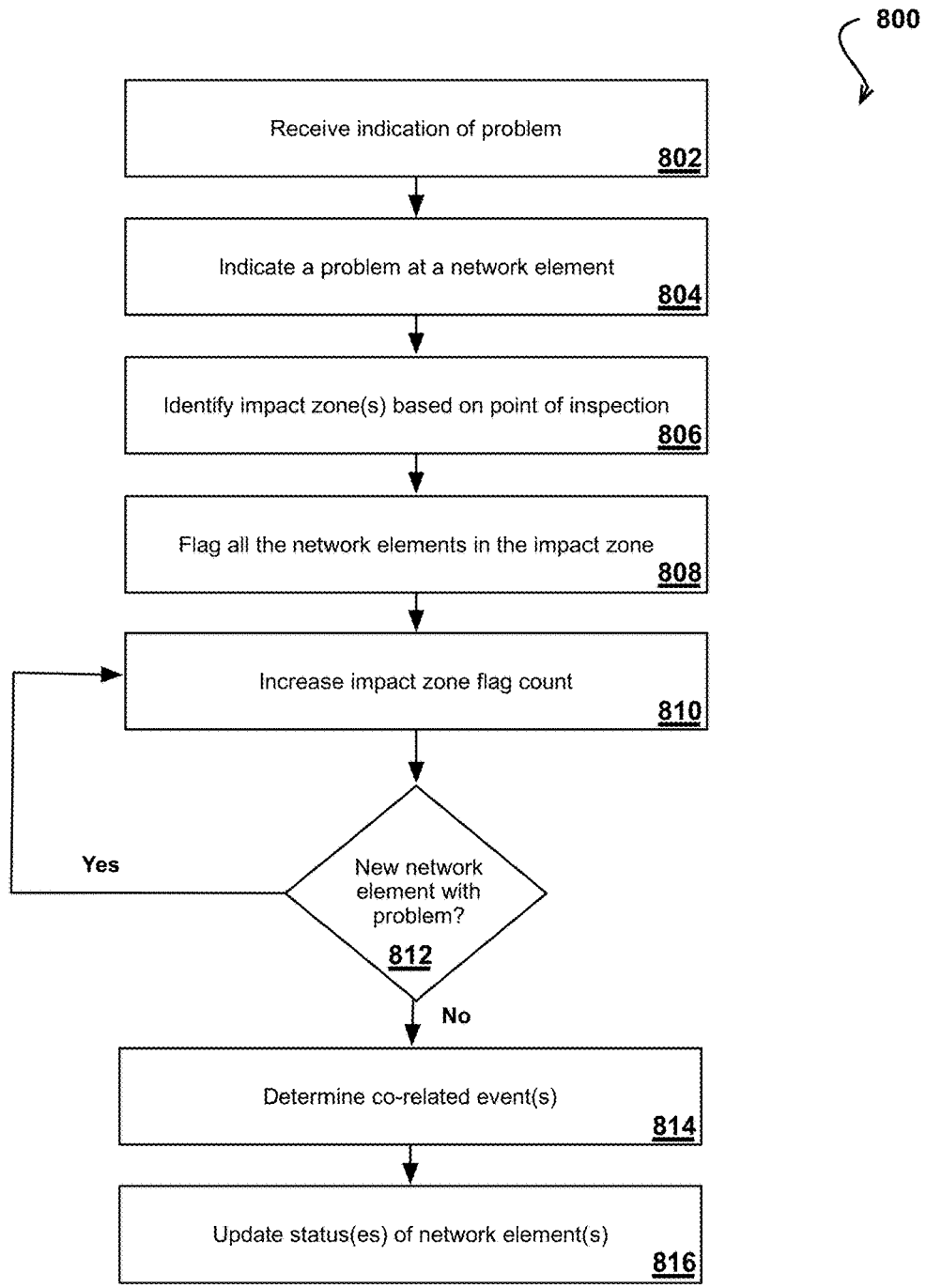
FIG. 8 illustrates an example process that is executed when a problem or issue is detected in the network (and transmitted to the heat map controller) based on the severity of the alert in accordance with some embodiments of the subject technology.

FIG. 8 illustrates an example process 800 that is executed when a problem or issue is detected in the network (e.g., failures, errors or timeouts, etc.) and transmitted to the heat map controller, based on the severity of the alert (e.g., network not reachable, performance issues, packet drops, over utilization, etc.) in accordance with some embodiments of the subject technology. The process 800, in at least one embodiment, may be performed by a computing device or system running the heat map controller in order to update one or more graphical displays of respective heat maps for different levels of the network topology.

At step 802, an indication of a problem or issue is received by the heat map controller. At step 804, the heat-map controller indicates a problem at a network element(s) by showing red for the corresponding cell (e.g., as in FIGS. 5 and 6) in the heat map or for a graphical representation of the network element (e.g., as in FIGS. 2 and 3). At step 806, the heat map controller identifies "recursive impact zone" based on the point of inspection. As discussed before, the impact zone includes all adjoining network elements (e.g., switches (edge, aggregate, access, etc.), routers, ToR switches, servers, storage, etc.) connecting directly to a network element corresponding to a point of inspection such as a switch, router, server or storage device, etc. Recursive impact zone may include all the network elements attached to the immediate affected network elements in a recursion or loop all the way to the edge to include all network elements in the impacted zone.

At step 808, the heat-map controller flags each network element corresponding to respective cells (or graphical representations) in the impact zone. An initial impact zone flag count is set to a number of network elements in the impact zone. Further, the heat-map controller indicates, by graying or dulling the color in the impact zone, to suggest that other network elements in the impact zone that currently are indicated in green (e.g., as being healthy or without problems), that these other network elements might not be reachable or have network bandwidth/reachability issues higher up at the network level hierarchy or could exhibit other issues.

At step 810, each time a new network element is discovered in an impact zone as having a problem(s) due to some alert, an impact zone flag count is increased to indicate multiple levels of issues to reach the network element. This impact zone flag value in turn decides how many other cells corresponding to other network elements or graphical representations of such network elements are made dull or gray.

At step 812, if a new network element within the impact zone actively shows red as indicating a problem, this would suggest that there could be a related event or events further up in hierarchy within the network that could be the root-cause of this issue. The impact zone for this node is again calculated and the impact zone flag is incremented as explained in step 810.

At step 814, the heat map controller determines one or more co-related events. By way of example, if an event matches a corresponding related event in a co-related events map (e.g., as shown below) in the above hierarchy, then this event could be specially colored to indicate that it is likely that the two events are related.

As used herein, a "co-related events map" refers to a modifiable list of potential symptoms caused by events. For example, a port up/down event on an aggregate switch can cause port flapping (e.g., a port continually going up and down) on the connected switch or router. This sample list will be used to co-relate events to troubleshoot problems:

| Event | Co-related event |
| --- | --- |
| Port up/down | Link flap |
| Egress buffer overflow | Ingress buffer overflow (TCP incast issues, top-of-rack egress buffer overflow and underlying server ingress buffer overflow) |
| High CPU | Network Timeout events (copy to CPU on switches not controlled could lead to other network timeouts) |

At step 816, since alerts are dynamic in some embodiments, the next message or alert received by the heat map controller could clear an alarm or show the system is healthy. Thus, when receiving a message indicating that a particular network element is back to healthy status, the heat map controller may update the status of this network element accordingly (e.g., indicating green corresponding to the network element in a heat map).

In this manner, if an application system wishes to actively probe the network to identify network health or potential routes or choose between servers, this updated heat map with one or more impact zones can better provide the result. Moreover, with information related to impact zone(s), two different servers indicated as being healthy (e.g., green) could be distinguished so as to identify one server in an impact zone that prevents higher bandwidth to reach this identified server.

Figure 9:
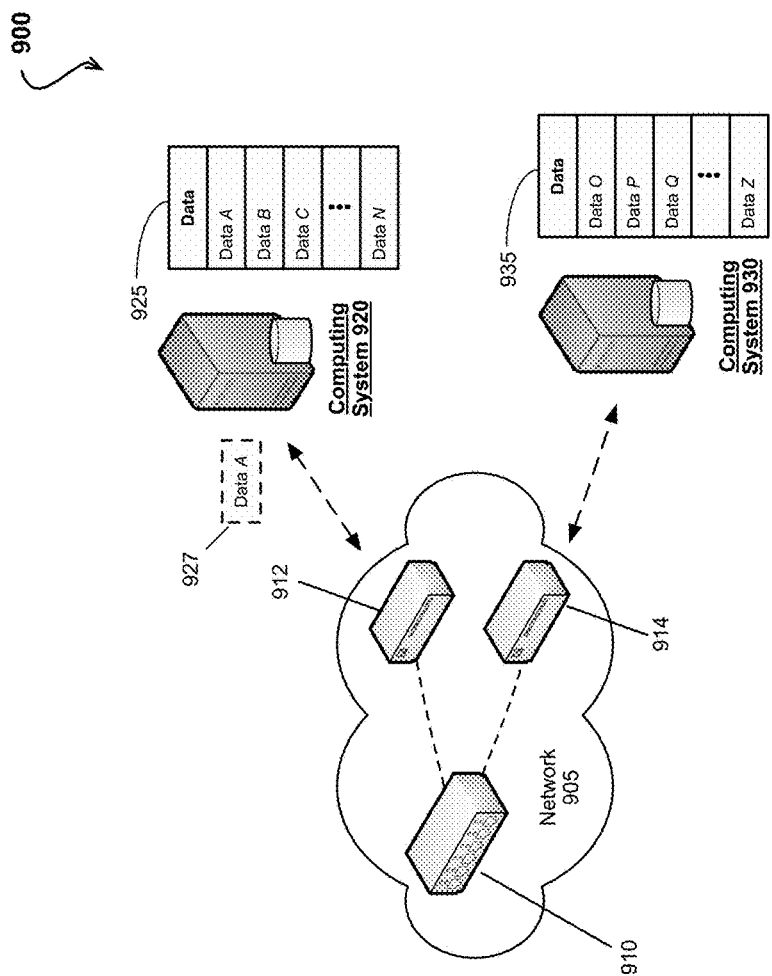
FIG. 9 illustrates an example network environment including a reverse impact zone in accordance with some embodiments of the subject technology.

FIG. 9 illustrates an example network environment 900 including a reverse impact zone in accordance with some embodiments of the subject technology.

As used herein, a reverse impact zone is mostly defined bottom up (e.g., origination from edge to the core). In one example of FIG. 9, suppose a server corresponding to computing system 920, including a set of data 925 in storage, needs to send data 927 to another server corresponding to computing system 930, including a set of data 935 in storage, in the same rack of a network 905, the reverse impact zone can be defined as including a path where the data 927 has to go to a ToR switch 912 of the computing system 920 and then be forwarded to the computing system 930 if local switching is available. In this example, the reverse impact zone includes the ToR switch 912 which has to transport or carry the data.

In another example of FIG. 9, if the ToR switch 912 does not support local switching or if the computing system 930 is located in another rack, then the data 927 has to be forwarded to another router or an aggregate switch 910 before it is forwarded to a ToR switch 914 of the computing system 930 and then to the computing system 930. In this example, the reverse impact zone includes ToR switch 912 of the computing system 920, the aggregate switch 910 and the ToR switch 914 for the computing system 930.

The communication between an application(s), network element and heat map controller follows an "adaptive networking communication protocol" as further described below. In this regard, a network element (e.g., router, switch, storage, server, IP camera, etc.) periodically pushes data to the heat map controller to provide data (metrics) to publish as heat maps.

Other forms of communication include the following:

(1) Initiated by network element (e.g., switch, server, storage or other network device, etc.) or an application running on the network element:
   a. If the server sees a disk(s) failure or the switch sees a server down, or even if an aggregate switch sees a ToR switch down (e.g., unreachable or rack-failure), this information of all affected units in an impact zone is messaged over to the heat map controller.
   b. The heat-map controller forwards this message to the application (e.g., Hadoop or any other distributed application).
   c. The application identifies which data-set(s) are lost.
   d. The application identifies where are the other replicas in the cluster from which another copy can be created.
   e. The application identifies where all the copies for these replicas should be placed based on the scheduler logic without considering the network into picture with all potential alternatives.
   f. The application messages this information of list of all potential (chosen initially based on application logic of pruning some nodes as not fit) source replica from where an additional copy is initiated from and destination replica, to which a new replica will be copied to, to the heat map controller.

An example is described in the following:
Copy block A, B, C from the following locations:

| Blocks | Source | Destination | Copies | Pipelined |
|---|---|---|---|---|
| A | x, y | d, e, f | 2 | 1 |
| B | m | n, p | 1 | 1 |
| C | i, j | k, l | 1 | 1 |

In the first row above, block A is copied from either network elements x or y to either network elements d or e or f. If pipelined and number of copies is more than 1 then, after the first copy, follow with another copy from a network element that is initially chosen to any other network elements remaining in the destination.
   g. The heat map controller places this information in an incoming queue of requests (could be multiple-queue based on priority of request e.g.: A request made by CEO is placed in a higher priority queue than a request coming from a test job or experimental job), the queues could also be reordered based on aging in individual queues based on retries.
   h. Considering example above, first line, once a request is accepted for processing from the queue, this would trigger the Heat-map controller to identify the reverse impact zones for copying from network element x to network element d, network element x to network element e, network element x to network element f and network element y to network element d, network element y to network element e and network element y to network element f and choosing one of those, say network element "d", check a reverse impact zone for network element d to network element e and network element d to network element f to finalize on a suggested placement (if pipelined) based on how it would impact the heat metric on the nodes of the reverse-impacted zone. The controller has to iterate through all combinations to find the best placement based on the heat-map suggestion and whether replica placement is pipelined (e.g., network element x copies to network element d and then network element d copies to network element e (or network element f))

This could result in a response such as the following from the heat-map controller if the copy is pipelined or concurrent based on the application framework (Hadoop is pipelined, others could be concurrent).

(pipelined)

| Block | Source | Destination | Pipelined |
|---|---|---|---|
| A | x | d | 1 |
| A | d | e | 1 |

(concurrent)

| Block | Source | Destination | Pipelined |
|---|---|---|---|
| A | x | d | 0 |
| A | y | e | 0 | i. The heat map controller verifies if the suggested source and replica placement would be best fit given the jobs demand (no new higher priority job request) and network/resource availability and updates the heat-metrics (both utilization and duration) with the final list while maintaining changes made for this specific job id and time (needed in case a job is cancelled or killed, then the metrics need to be freed up or refreshed based on the routes). The heat map controller sends this list to the application.
   j. The applications 1) starts the copies after waiting for the default wait period (if needed based on application logic) or 2) starts the replication right away.

(2) Initiated by Distributed Application (Hadoop like distributed application)
   a. If the application starts a new job by ingesting data, the application is aware of the size of the data and the splits of the file and same as steps from (e) to (j) of (1) described above are performed.

(3) Initiated by Heat-Map controller
   a. This is similar to (1) described above, if a server doesn't respond even if it looks healthy from a heat maps point of view due to any application specific reasons, i.e., if the server hosting data times out from the distributed application point of view, then after a default elapsed time, the data is deemed lost or a disk failure is indicated.
   b. Repeat the same steps from (c) to (j) of (1) above By following the approach, the network, application and heat-map controller have proactively updated the heat in the heat-map and application has indirectly become network aware. Any next event will be based on this current state of the updated heat-map, and if a new replica has to be placed, the negotiation would ensure to pick up a reverse impact zone which is less "hotter" to ensure better network performance. The routing protocol could pick up these updated heat maps to adapt to the changing network usage to provide different routes.

The following discussion relates to actual and planned/estimated metric(s) as used by the subject technology. In some embodiments, metrics may be calculated by reverse impact zones through application awareness: the network element (e.g., router, switch, storage device, server, IP camera, etc.) periodically pushes data to the heat-map controller to gather data (metrics) to publish as heat maps. This forms the base metrics as these are observed, which are considered the "actual metrics."

To identify more useful "planned metrics," the following approaches may be used. In a big data deployment scenario in a datacenter, the following main events (e.g., controlled and uncontrolled) trigger application to ingest data within a network.

Similarly as done for a network utilization heat score, a heat score is added for the I/O utilization for the server/storage whenever data is being copied to or from a node. The I/O (e.g., for input/output storage access) utilization score may be dependent on the size of the data being copied. As servers are selected to place data on the servers or copy data from the servers, this burns I/O bandwidth available on those servers and consumes available storage. Hence, this can be estimated as a heat score against the metric (e.g., I/O) based on the data size being copied and the available I/O bandwidth may be estimated (e.g., copying 1 TB to a 4 TB size drive with 100 MBps I/O bandwidth takes 10000 seconds which is 167 minutes or 2 hours and 47 minutes). Copying of data leads to CPU and memory utilization and, thus, a small delta or amount can be added to the heat score for CPU and memory utilization on those systems (e.g., the server and/or storage where data is copied from and copied to) to provide the planned/estimated metric.

Controlled
a) New job, ingesting input data (and for replication)
b) Periodic and controlled backups or periodic data ingestion at regular hours Uncontrolled
c) Disk or Server failure, prompting the application to copy the data again or replicate the data
d) The application job creating lots of data during execution (e.g., a web crawler downloading the webpages from links)

The application has to decide where the data is going to be placed through splits, and the application is aware as to how much data needs to be copied. While the application can choose or is aware of the servers where the data is going to be copied from and copied into, this information can be communicated with the heat map controller. In this regard, the heat map controller through reverse impact zones can identify switches and ports which are going to carry the network traffic. Each time a switch carries the traffic, a heat score for that switch/router and port is increased relative to its bandwidth and size for the potential time it could take. The switch/router would expect a higher utilization for specific time intervals based on the data provided by the application. The switch/router periodically monitors the utilization for the expected utilization every few seconds (can be tuned). The heat score can be reduced when the application informs the copy job is completed or when the observed utilization begins to drop (for few consecutive checks) to consider timeouts. The heat score is also reduced if a copy job is cancelled in between and the application informs that the copy job is cancelled. This provides a heat score to easily compare what to expect to happen in different sections of the network for the next few minutes to hours.

Annotation of Network Activity Through Different Phases of Execution

Embodiments described herein for annotating network activity (including I/O activity, and utilization of resources such as CPU, memory, etc.) through different phases of execution includes enabling communication between components of the system(s) described herein, including the network/compute/storage devices, heat map controller and the distributed application, which could be implemented in SDN like technologies in order to be able to co-relate application events with network and infrastructure behavior and vice-versa (e.g., network/infrastructure events with application behavior to identify and profile the specific job).

In an embodiment, a job is submitted to a distributed application (e.g., Hadoop). The job could be for ingestion of data, a standard map-reduce job, or any kind of distributed job on the distributed application.

The application through its scheduler logic and other negotiations identifies which nodes are involved in this initial phase. In the example of ingesting data, nodes where data is to be copied to are identified, and in case of a map-reduce job, nodes that are running map and where all reduce has started are identified. In an example, this processing of identifying nodes may cover nodes throughout the cluster or a subset of nodes in the cluster. This is understood as the initial phase or map phase (e.g., if running a map-reduce job) or the application term for the phase.

The list of nodes identified above forms the first list of servers/storage to be monitored in this initial phase. If for a copy operation from node A to node B is initiated (e.g., in a case of data ingest), applying the principle of "Reverse Impact Zone" defined and described before, then all the network components (e.g., ToR, access, aggregate or core switch/router) that the data travels through is added to the list of monitored network elements during this phase. Otherwise, if it is just nodes selected in the map phase (e.g., without any initial data transfer), then all network elements (e.g., switch/routers) in the network hierarchy connecting all of the set of nodes are included in the initial list of network components to be monitored.

One or more level of network hierarchy nodes are added to list to be monitored to include potential problems that are created from network higher up in the hierarchy. This list of server/storage/network components forms the list of nodes to be monitored in this initial phase. This list is provided to the application-network controller (e.g., the heat map controller described before) for monitoring. The application-network controller takes a snapshot (e.g., as a drillable heat map) every few seconds or a period of time (e.g., 15 or 30 seconds and/or tunable based on application requirements) along with flagging any network/infrastructure failures/errors along a timeline.

The monitoring application may also take the average of network, I/O, RAM and CPU utilization of all the servers or network components being monitored during these snapshots and/or phases. The distributed application also relays any application events or phase changes such as timeouts, mapper/reducer task failure or any application event to the application-network controller.

The application-network controller adds these additional application annotations to the snapshot timeline to get a holistic view. The distributed application may send any change of the list of nodes to be monitored (e.g., in response to tasks being completed on the node or tasks started on new nodes) to add or remove nodes from the list of monitored nodes.

The distributed application sends additional annotation such as end of phases or start of phases to help add more insight to suggest change in behavior. For example, in a Hadoop environment, the distributed application would send information related to a phase ("phase information"), for example, such as a map phase start, a map phase end, a reduce phase start, or a shuffle phase start as in the case of map-reduce distributed jobs. In an example, such phase information may be annotated in the GUI by the application-network controller. This is valuable as generally a reduce phase has more ingest traffic to its nodes, a shuffle phase starts network traffic, a map phase could lead to high CPU and/or high IO, and a reduce phase could lead to high network, high CPU, high IO, etc. In an embodiment, this phase information helps to better tune the network components.

Throughout the execution of the job, nodes are added and removed based on which node has tasks running on them or completed. Network elements connecting these set of nodes are added or removed accordingly for monitoring. One or more level of network hierarchy nodes are added to list to be monitored to include potential problems created from network higher up.

This set of snapshots along with the average of network, I/O, RAM and/or CPU utilization of all the involved network nodes or components during the specific phases gives a thorough profile report of the application resource utilization and individual job behavior throughout to provide deeper insights which may be advantageous to optimize business critical jobs, provide better scheduling for job resources (e.g., in choosing better I/O systems for phases with high I/O, etc.), identify bottlenecks, etc., both from the application point of view and for distributed application resource manager and schedulers. Other advantages and/or usage are contemplated herein and within the scope of the subject technology. This data for the Individual Job profile is the data collected in the Application-network controller as mentioned above for the specific job and data could be stored just as a text file or CSV file or in a data base for internal software processing or could be used to provide a GUI report for the job.

Figure 10:
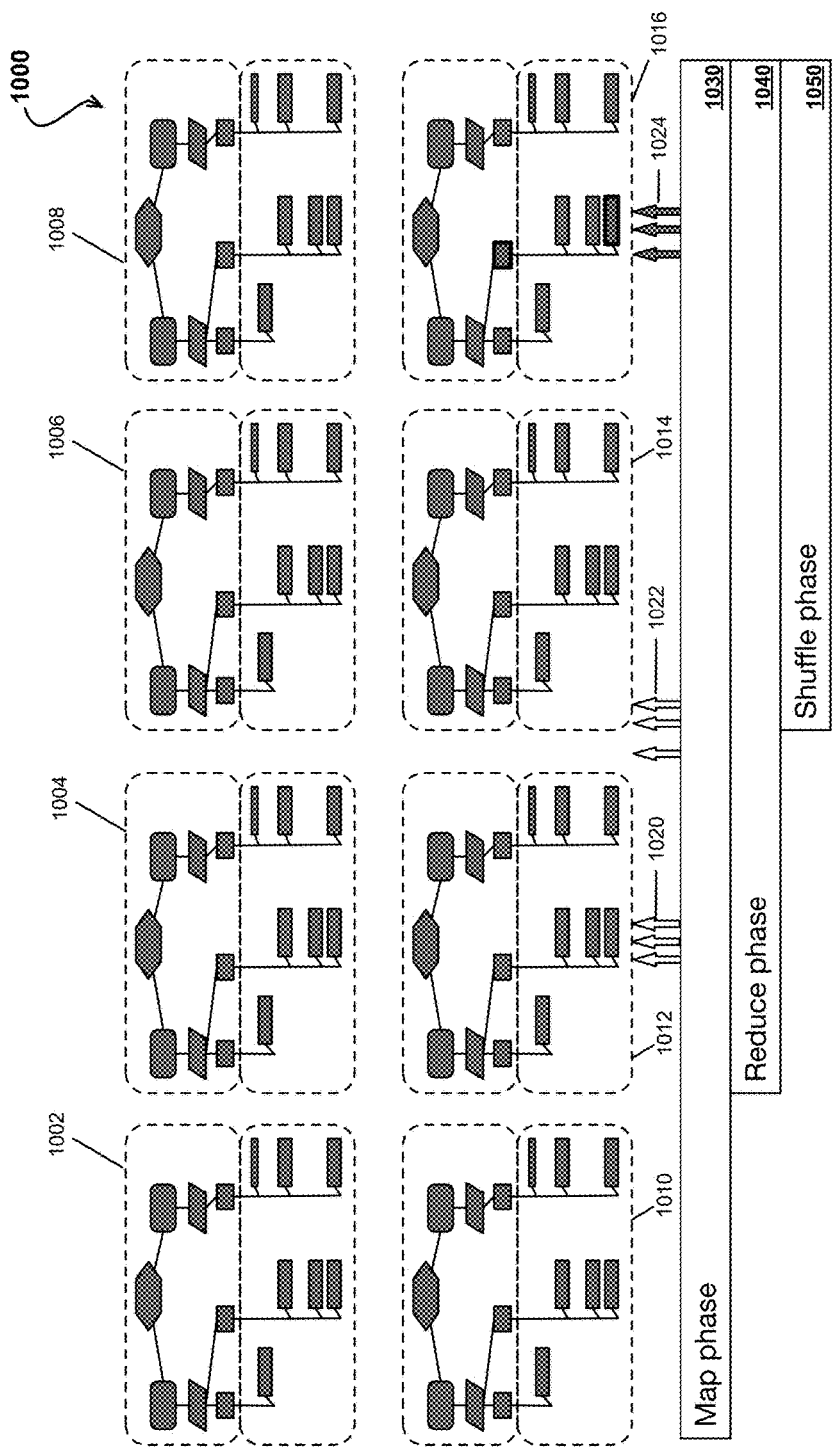
FIG. 10 illustrates an example monitoring of a job using drillable time-series heat maps in accordance with some embodiments of the subject technology.

FIG. 10 illustrates an example monitoring of a specific or individual job using drillable time-series heat maps in accordance with some embodiments of the subject technology. The GUI could be one representation of the Individual Job Profile data collected in the Application-network controller. In some embodiments, a GUI 1000 may be provided which includes heat maps that are represented in a timeline that maps network activity (including I/O activity, resources such as CPU, memory, etc.) over a period of time as the operation(s) or job is executing. As discussed before, the operation may be a data ingestion operation for a Hadoop distributed application.

As shown, snapshots 1002, 1004, 1006 and 1008 are included as part of a measurement of actual metrics which may be generated by the application-network controller (as discussed above). Snapshots 1010, 1012, 1014, and 1016 are included as part of planned or estimated metrics. Each of the aforementioned snapshots may represent a drillable heat map that indicates network activity for each network element in a hierarchy that is involved in completing the job. Each of the snapshots may also include resource utilization heat metrics of resources such as CPU, Input/Output (I/O), memory, etc., in the heat map or graphs and presented along with network activity. Information, as different graphical representations, for different phases of executing an operation including a map phase 1030, a reduce phase 1040, and a shuffle phase 1050 are further shown and represent a progressing timeline when executing the operation.

To annotate different network activity during a particular phase of operation, annotations in the form of a graphical representation (e.g., an arrow as illustrated) may be provided in the GUI 1000. It also includes Resource utilization heat metrics (planned or estimated metrics) of resources such as network, CPU, Input/Output (I/O), Memory, etc., in the heat map or graphs. As discussed before, actual metrics while the operation is executing may be different (sometimes substantially) than the planned or estimated metrics that are calculated by the application-network controller. Thus, the GUI 1000 enables a visual presentation in which snapshots of actual metrics and planned/estimated metrics are presented along a timeline for comparison. As illustrated, annotations 1020 and 1022 may indicate map failures. An annotation 1024 may indicate a reduce failure. By using such annotations, problems during the execution of the operation may be indicated in the GUI 1000 for further review and troubleshooting by the user.

Figure 11:
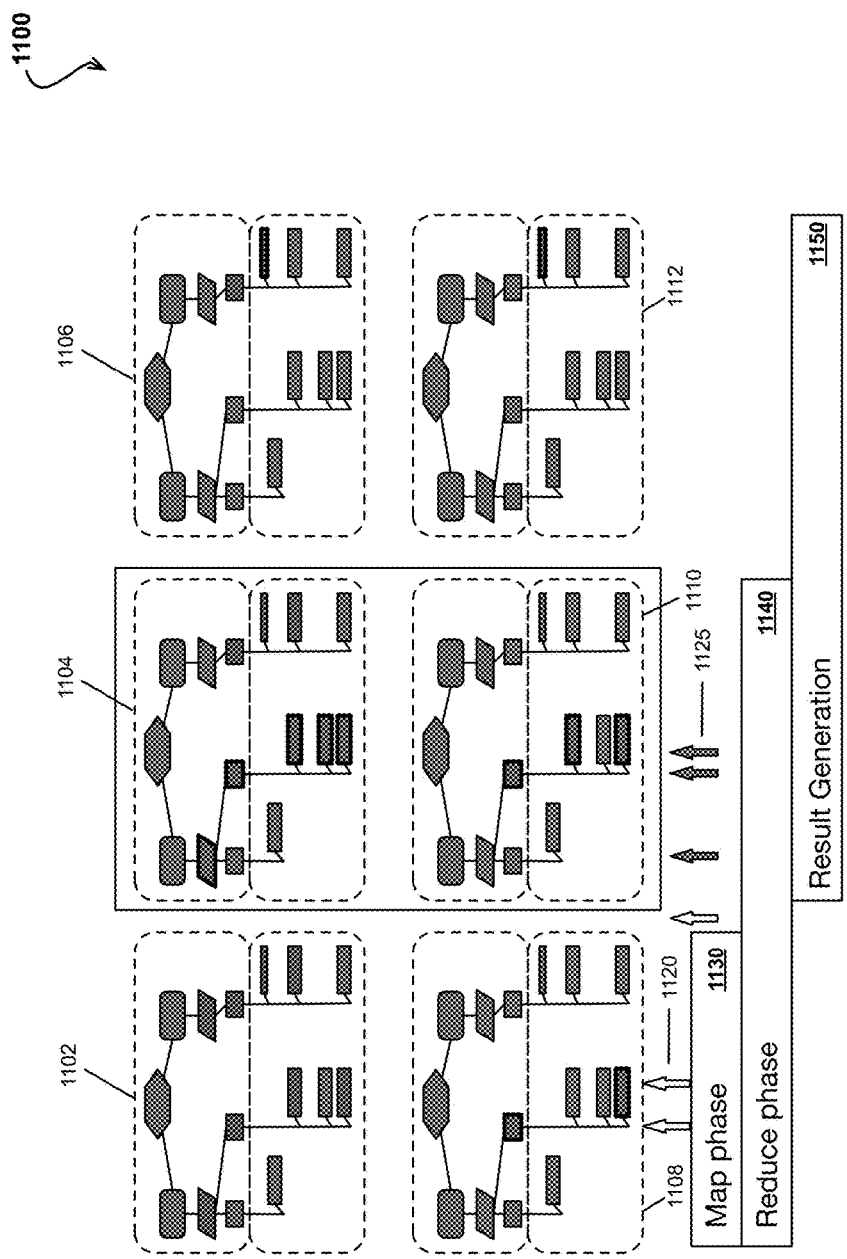
FIG. 11 illustrates an example monitoring of a job using drillable time-series heat maps in accordance with some embodiments of the subject technology.

FIG. 11 illustrates an example of monitoring of a job using drillable time-series heat maps in accordance with some embodiments of the subject technology. In some embodiments, a GUI 1100 may be provided which includes heat maps that are represented in a timeline that maps network activity (along with resource utilization heat metrics of resources such as CPU, Input/Output (I/O), Memory, etc., in the heat map) over a period of time as the operation is executing.

As shown, snapshots 1102, 1104, and 1106 are included as part of a measurement of actual metrics which may be generated by the application-network controller (as discussed above). Snapshots 1108, 1110, and 1112 are included as part of planned or estimated metrics. Each of the aforementioned snapshots may represent a drillable heat map that indicates network activity for each network element in a hierarchy that is involved in completing the job. Information, as different graphical representations, for different phases of executing an operation including a map phase 1130, a reduce phase 1140, and a result generation phase 1150 are further shown and represent a progressing timeline when executing the operation. In the example of FIG. 11, the snapshots 1104 and 1110 during the reduce phase 1140 are indicating as having more load by annotations 1125. Further annotations 1120 indicate a map failure during the map phase 1130. The aforementioned snapshots may provide insights on TCP-incast related problems on some of the network elements in the hierarchy.

Figure 12:
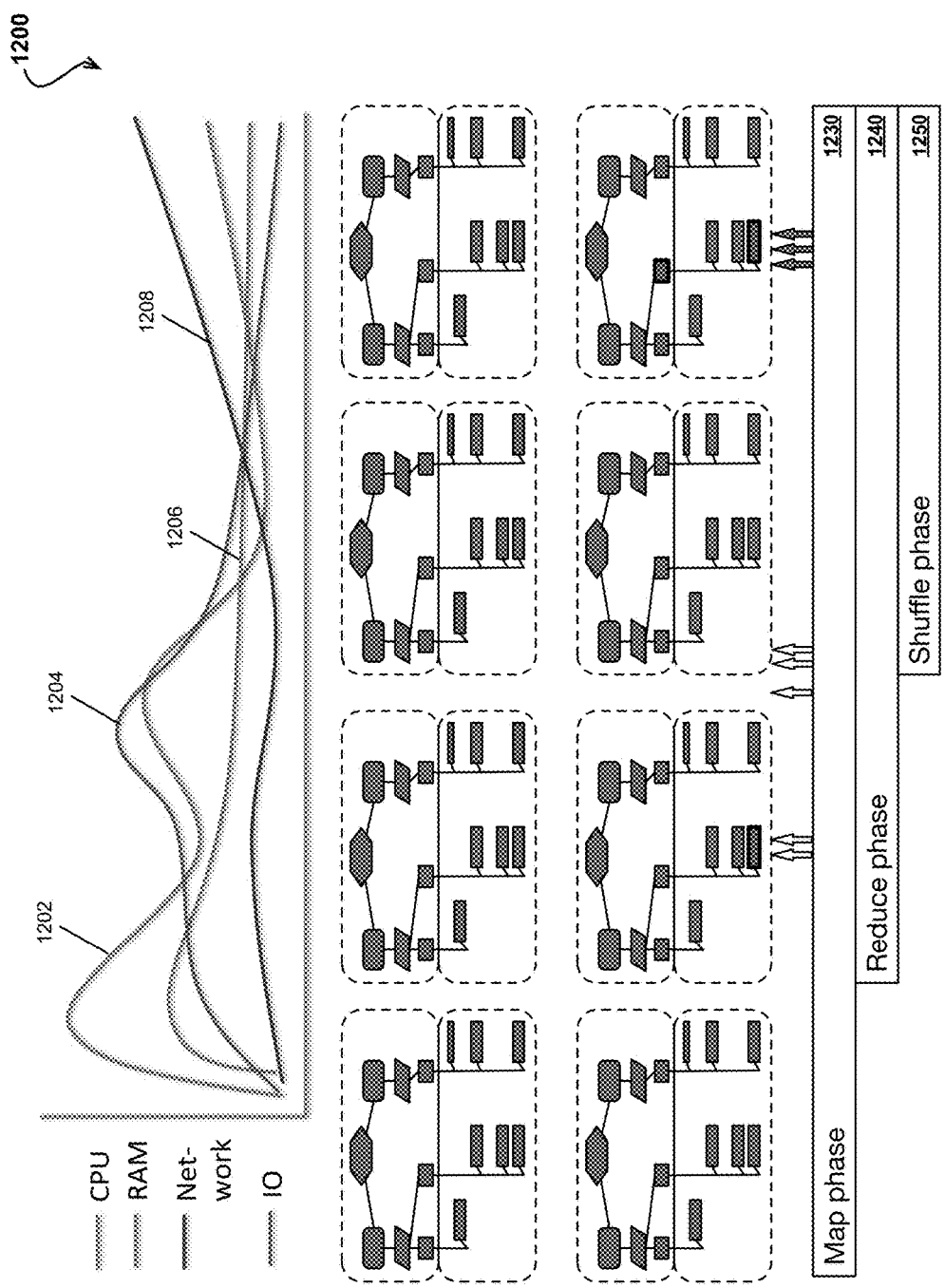
FIG. 12 illustrates an example individual job diagnostic along with aggregate CPU, network, RAM and I/O graphs in accordance with some embodiments of the subject technology.

FIG. 12 illustrates an example individual job diagnostic (or profile) along with aggregate CPU, network, RAM and I/O graphs in accordance with some embodiments of the subject technology. In some embodiments, a GUI 1200 may be provided which includes heat maps that are represented in a timeline that maps network activity along with other resource activities over a period of time as the operation(s) or job is executing. The GUI is more for a high-level overview, or one form of reporting the data collected for the individual job diagnostic (or profile), this data could be used and represented in the GUI graph for any other processing such as better resource management or for better scheduling. In an example, the result of a job diagnostic or profile is job profile data which can then be graphically represented in the GUI 1200. The job profile data may be in any appropriate format, including for example, a comma-separated values (CSV) file, text file (e.g., flat file), binary data, or data formatted accordingly for consumption and/or presentation by the application-network controller (or third party application), among other types of formats.

As illustrated, the GUI 1200 includes respective graphs tracking different types of metrics for resource utilization during different phases of executing the job. The GUI 1200 includes a CPU graph 1202, an I/O graph 1204, a RAM graph 1206, and a network graph 1208. Such graphs may represent average values of CPU, I/O, RAM and network utilization or consumption corresponding to one of a map phase 1230, a reduce phase 1240, and a shuffle phase 1250.

Figure 13:
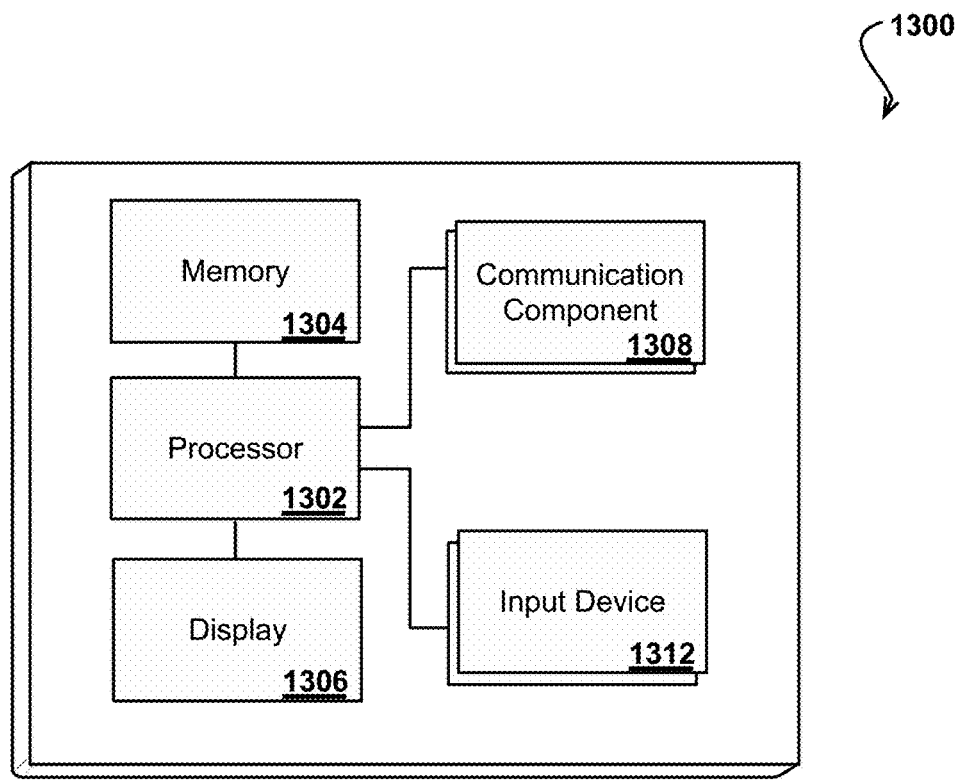
FIG. 13 illustrates a logical arrangement of a set of general components of an example computing device.

FIG. 13 illustrates a logical arrangement of a set of general components of an example computing device 1300. In this example, the device includes a processor 1302 for executing instructions that can be stored in a memory device or element 1304. As would be apparent to one of ordinary skill in the art, the device can include many types of memory, data storage, or non-transitory computer-readable storage media, such as a first data storage for program instructions for execution by the processor 1302, a separate storage for images or data, a removable memory for sharing information with other devices, etc. The device typically will include some type of display element 1306, such as a touch screen or liquid crystal display (LCD), although devices such as portable media players might convey information via other means, such as through audio speakers. As discussed, the device in many embodiments will include at least one input element 1312 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1300 of FIG. 13 can include one or more communication components 1308, such as a Wi-Fi, Bluetooth, RF, wired, or wireless communication system. The device in many embodiments can communicate with a network, such as the Internet, and may be able to communicate with other such devices.

The various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system, comprising:
processor; and
memory including instructions that, when executed by the processor, cause the system to:
receive information for a job to be processed by a distributed application, the job being submitted from a user or other application and having at least two phases of execution for completion of the job;
identify a set of network elements to monitor during processing of the job, the set of network elements corresponding to (a) nodes that are involved in at least a first phase of the job and (b) one or more level of network hierarchy nodes to include potential problems that are created from network higher up in the hierarchy;
monitor, over a period of time, the set of network elements during processing of the job for the at least two phases of execution;
detect a failure during at least one phase of execution in at least one network element;
determine a recursive impact zone of all network elements connected to the at least one network element, in response to detecting the failure;
flag the network elements of the recursive impact zone; and
generate job profile data indicating at least the failure and the network elements of the recursive impact zone;
indicate, in a graphical representation, the failure in the at least one network element based at least in part on the job profile data;
wherein the recursive impact zone includes all further adjoining network elements connected to the at least one network element in a hierarchy to the at least one network element, but does not include adjoining network elements not in the hierarchy to the at least one network element.

2. The system of claim 1, wherein the instructions further cause the processor to:
provide, for display, the graphical representation indicating the failure at a position along a timeline corresponding to the at least one phase of execution.

3. The system of claim 1, wherein to monitor, over the period of time, the set of network elements comprises:
providing a first set of heat maps, wherein each heat map represents actual metrics for the set of network elements during completion of the job; and providing a set of second heat maps that each second heat map represents estimated or planned metrics for the set of network elements for each of the at least two phases of execution.

4. The system of claim 1, wherein to monitor, over the period of time, the set of network elements further comprises:
determining averages of network, I/O, RAM and CPU utilization of each of the network elements that are monitored during each of the at least two phases of execution.

5. The system of claim 1, wherein to monitor, over the period of time, the set of network elements further comprises:
receiving information related to a phase of execution for the job.

6. The system of claim 5, wherein the information related to the phase of execution comprises at least one of a map phase start, a map phase end, a reduce phase start, or a shuffle phase start.

7. The system of claim 6, wherein the instructions further cause the processor to:
provide, for display, the graphical representation indicating the failure at a position along a timeline corresponding to the at least one phase of execution;
indicate, in a second graphical representation, the information related to the phase of execution; and
provide, for display, the second graphical representation indicating the failure at a position along a timeline corresponding to the at least one phase of execution.

8. The system of claim 1, wherein the set of network elements comprises a set of servers or storage devices in a network hierarchy to be monitored in which data travels through for completing the job.

9. A computer-implemented method, comprising:
receiving information for a job to be processed by a distributed application, the job being submitted from a user or other application and having at least two phases of execution for completion of the job;
identifying a set of network elements to monitor during processing of the job, the set of network elements corresponding to (a) nodes that are involved in at least a first phase of the job and (b) one or more level of network hierarchy nodes to include potential problems that are created from network higher up in the hierarchy;
monitoring, over a period of time, the set of network elements during processing of the job for the at least two phases of execution;
detecting a failure during at least one phase of execution in at least one network element;
determining a recursive impact zone of all network elements connected to the at least one network element; and
generating job profile data indicating at least the failure;
indicating, in a graphical representation, the failure in the at least one network element based at least in part on the job profile data;
wherein the recursive impact zone includes all further adjoining network elements connected to the at least one network element in a hierarchy to the at least one network element, but does not include adjoining network elements not in the hierarchy to the at least one network element.

10. The computer-implemented method of claim 9, further comprising:

providing, for display, the graphical representation indicating the failure at a position along a timeline corresponding to the at least one phase of execution.

11. The computer-implemented method of claim 9, wherein to monitor, over the period of time, the set of network elements further comprises:
collecting monitoring data in an application-network controller, the monitoring data indicating at least one of a utilization of resources and network activity during execution of the job;
providing the monitoring data collected in the application-network controller for inclusion with the job profile data for the job;
providing a first set of heat maps, wherein each heat map represents actual metrics for the set of network elements during completion of the job; and
providing a set of second heat maps that each second heat map represents estimated or planned metrics for the set of network elements for each of the at least two phases of execution.

12. The computer-implemented method of claim 9, wherein to monitor, over the period of time, the set of network elements further comprises:
determining averages of network, I/O, RAM and CPU utilization of each of the network elements that are monitored during each of the at least two phases of execution.

13. The computer-implemented method of claim 9, wherein to monitor, over the period of time, the set of network elements further comprises:
receiving information related to a phase of execution for the job.

14. The computer-implemented method of claim 13, wherein the information related to the phase of execution comprises at least one of a map phase start, a map phase end, a reduce phase start, or a shuffle phase start.

15. The computer-implemented method of claim 14, further comprising:
providing, for display, the graphical representation indicating the failure at a position along a timeline corresponding to the at least one phase of execution;
indicating, in a second graphical representation, the information related to the phase of execution; and
providing, for display, the second graphical representation indicating the failure at a position along a timeline corresponding to the at least one phase of execution.

16. The computer-implemented method of claim 9, wherein the set of network elements comprises a set of servers or storage devices in a network hierarchy to be monitored in which data travels through for completing the job.

17. A non-transitory computer-readable medium including instructions stored therein that, when executed by a computing device, cause the at least one computing device to:
receive information for a job to be processed by a distributed application, the job being submitted from a user or other application and having at least two phases of execution for completion of the job;
identify a set of network elements to monitor during processing of the job, the set of network elements corresponding to (a) nodes that are involved in at least a first phase of the job and (b) one or more level of network hierarchy nodes to include potential problems that are created from network higher up in the hierarchy;
monitor, over a period of time, the set of network elements during processing of the job for the at least two phases of execution;
detect a failure during at least one phase of execution in at least one network element;
determine a recursive impact zone of all network elements connected to the at least one network element, in response to detecting the failure;
flag the network elements of the recursive impact zone; and
generate job profile data indicating at least the failure and the network elements of the recursive impact zone;
indicate, in a graphical representation, the failure in the at least one network element based at least in part on the job profile data;
wherein the recursive impact zone includes all further adjoining network elements connected to the at least one network element in a hierarchy to the at least one network element, but does not include adjoining network elements not in the hierarchy to the at least one network element.

18. The non-transitory computer-readable medium of claim 17, wherein the instructions further cause the at least one computing device to:
provide, for display, the graphical representation indicating the failure at a position along a timeline corresponding to the at least one phase of execution.

19. The non-transitory computer-readable medium of claim 17, wherein to monitor, over the period of time, the set of network elements further comprises:
collecting monitoring data in an application-network controller, the monitoring data indicating at least one of a utilization of resources and network activity during execution of the job;
providing the monitoring data collected in the application-network controller for inclusion with the job profile data for the job;
providing a first set of heat maps, wherein each heat map represents metrics for the set of network elements during completion of the job; and
providing a set of second heat maps that each second heat map represents estimated or planned metrics for the set of network elements for each of the at least two phases of execution.

20. The non-transitory computer-readable medium of claim 17, wherein to monitor, over the period of time, the set of network elements further comprises:
determining averages of network, I/O, RAM and CPU utilization of each of the network elements that are monitored during each of the at least two phases of execution.

* * * * *